(12) United States Patent
Spangler et al.

(10) Patent No.: US 8,926,929 B2
(45) Date of Patent: Jan. 6, 2015

(54) METHOD AND APPARATUS FOR PRODUCING GRANULAR SILICON

(75) Inventors: Michael V. Spangler, Soap Lake, WA (US); Glen Stucki, Bellingham, WA (US)

(73) Assignee: REC Silicon Inc, Moses Lake, WA (US)

( * ) Notice: Subject to any disclaimer, the term of this patent is extended or adjusted under 35 U.S.C. 154(b) by 860 days.

(21) Appl. No.: 12/685,536

(22) Filed: Jan. 11, 2010

(65) Prior Publication Data

US 2010/0226844 A1 Sep. 9, 2010

Related U.S. Application Data

(60) Provisional application No. 61/143,697, filed on Jan. 9, 2009.

(51) Int. Cl.
*C01B 33/02* (2006.01)
*B01J 8/34* (2006.01)
*B01J 8/18* (2006.01)
*C01B 33/027* (2006.01)

(52) U.S. Cl.
CPC ........ *B01J 8/34* (2013.01); *B01J 8/1836* (2013.01); *C01B 33/027* (2013.01); *B01J 2208/00132* (2013.01); *B01J 2208/0084* (2013.01)
USPC .......................................... 423/349

(58) Field of Classification Search
CPC ............ B01J 8/34; B01J 8/1836; B01J 2208/000132; B01J 2208/0084; C01B 33/047
USPC ............ 423/348–350; 422/146, 147, 139
See application file for complete search history.

(56) References Cited

U.S. PATENT DOCUMENTS

| 4,115,927 | A |   | 9/1978  | Rosensweig |
|-----------|---|---|---------|------------|
| 4,176,710 | A |   | 12/1979 | Gansauge et al. |
| 4,213,937 | A |   | 7/1980  | Padovani et al. |
| 4,423,274 | A |   | 12/1983 | Daviduk et al. |
| 4,499,944 | A | * | 2/1985  | Komakine ............... 165/104.16 |
| 4,778,661 | A |   | 10/1988 | Avidan et al. |
| 4,899,014 | A |   | 2/1990  | Avidan et al. |
| 4,904,452 | A |   | 2/1990  | Acharya et al. |
| 5,798,137 | A |   | 8/1998  | Lord et al. |

(Continued)

FOREIGN PATENT DOCUMENTS

| EP | 0 776 692 A1 | 6/1997 |
| EP | 2 055 674 A1 | 5/2009 |

(Continued)

OTHER PUBLICATIONS

International Search Report and Written Opinion, issued by the European Patent Office on Apr. 22, 2010, for corresponding PCT Patent Application No. PCT/US2010/020656, filed Jan. 11, 2010, 10 pp.

(Continued)

*Primary Examiner* — Anthony J Zimmer
(74) *Attorney, Agent, or Firm* — Klarquist Sparkman, LLP

(57) ABSTRACT

Silicon granules are produced by chemical vapor deposition on seed particles inside a chamber within a fluidized bed reactor. The chamber contains an obstructing member, or bubble breaker, which is sized and shaped to restrict the growth of bubbles inside the chamber and which has interior passageways through which a heated fluid passes to transfer heat to gas inside the chamber.

5 Claims, 1 Drawing Sheet

(56) References Cited

U.S. PATENT DOCUMENTS

| | | |
|---|---|---|
| 6,451,277 B1 | 9/2002 | Lord |
| 6,827,786 B2 | 12/2004 | Lord |
| 7,001,579 B2 | 2/2006 | Metzger et al. |
| 7,641,872 B2 | 1/2010 | Inaba |
| 2004/0052715 A1* | 3/2004 | Metzger et al. ............... 423/349 |
| 2004/0151652 A1 | 8/2004 | Herold et al. |
| 2008/0000622 A1 | 1/2008 | Hugues et al. |
| 2008/0241046 A1* | 10/2008 | Hertlein et al. ............... 423/349 |

FOREIGN PATENT DOCUMENTS

| | | | |
|---|---|---|---|
| WO | WO 88/04199 A1 | 6/1988 | |
| WO | WO 2004/013044 | 2/2004 | |
| WO | WO 2007/028776 A2 * | 3/2007 | ............ C01B 33/029 |

OTHER PUBLICATIONS

First Examination Report, dated Nov. 9, 2012, issued in corresponding European Patent Application No. 10700632.2.

First Office Action, dated Jun. 26, 2013, issued in corresponding China Patent Application No. 201080004317.2.

Second Office Action, dated Apr. 2, 2014, issued in corresponding China Patent Application No. 201080004317.2, and English-language partial summary thereof.

* cited by examiner

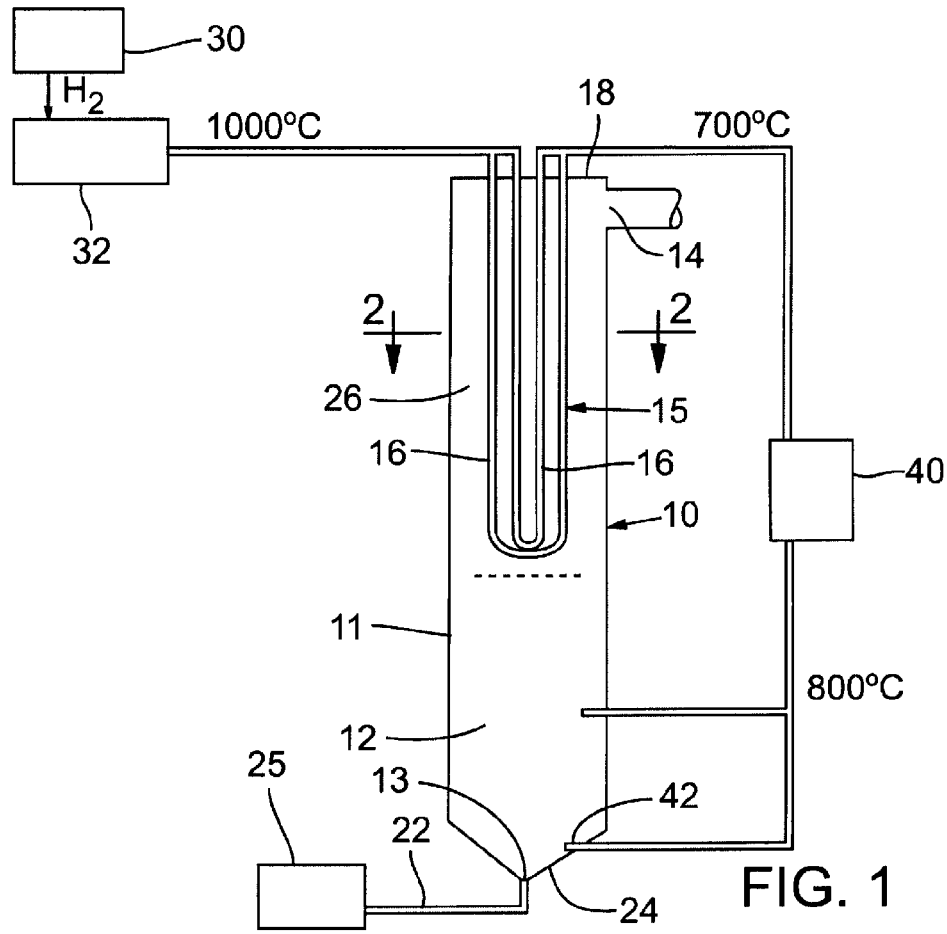
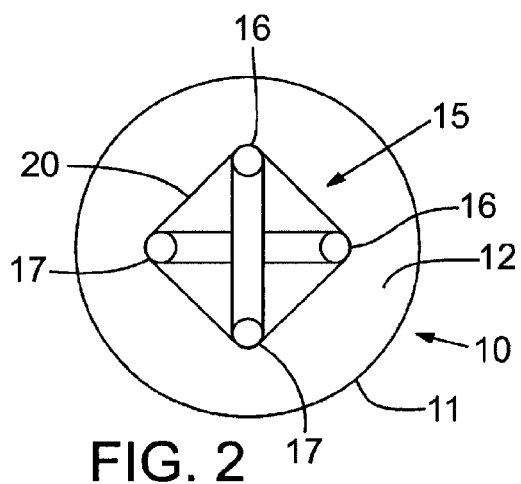
FIG. 2
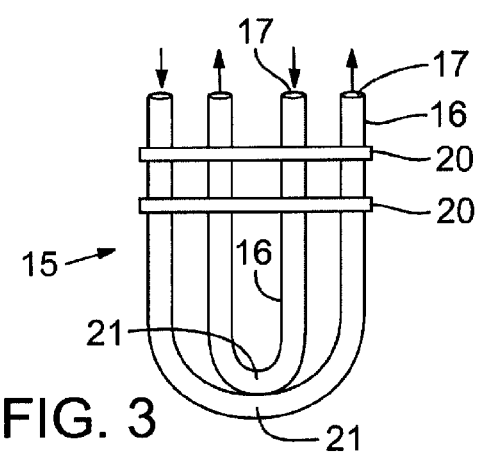
FIG. 3

METHOD AND APPARATUS FOR PRODUCING GRANULAR SILICON

CROSS REFERENCE TO RELATED APPLICATION

This claims the benefit of U.S. Provisional Application No. 61/143,697, filed Jan. 9, 2009, which is incorporated herein by reference.

BACKGROUND AND SUMMARY

Silicon deposition from silane inside a fluidized bed reactor is an endothermic reaction that requires an external energy source. Maintaining a desired operating temperature in such a reactor is difficult.

Heat can be added through the reactor walls. Alternatively, reactant streams can be preheated before they enter the reactor. In some cases, energy also can be "beamed in" via electromagnetic radiation, such as microwaves or lasers. Each of these methods has certain limitations.

The microwave option requires a suitable generator connected to the reactor. The generator must be able to withstand the temperatures and pressures of the reaction. The reactants must be able to absorb the wavelength of radiation the generator produces while the products must not absorb that same radiation lest the reaction be reversed back to the feedstocks. The generator also must operate at a reasonable efficiency. These conditions have seriously limited the use of electromagnetic radiation as the primary energy source in fluidized bed reactor designs.

Heating the reactor through the walls is simple and efficient. However, high heat fluxes require high temperatures which can seriously degrade the strength of the walls. Increasing the thickness of the walls to compensate for the lower strength reduces heat flow, which requires even higher temperatures to drive the heat through the walls. The higher temperatures weaken the walls further, which sets up a vicious cycle that soon reaches the point of diminishing returns. Also, the cross-sectional area of the reactor increases as the square of the reactor's diameter, while the available area for heat transfer (the circumference of the reactor) increases linearly with diameter. Thus, reactor size is limited by the heat transfer capacity.

Heating the reactants before they enter the reactor eliminates the need to transfer heat through the reactor walls. However, if the reactants are too hot, there is a risk of inducing an undesirable reaction in the feed piping. Inside the reactor, the entire fluidized bed should remain at the desired temperature. When performing an endothermic reaction, the reactants are superheated before entering the reactor to maintain the desired temperature throughout the entire bed. The amount of superheating may be so high that the bottom of the bed (where the reactants enter the fluidized bed reactor) is far above the desired operating temperature. This excessive bottom temperature can cause unwanted side reactions, or can cause the reactants to react immediately upon reaching the reactor instead of throughout the bed volume as intended. In either case, low yields or plugging at the inlet ports may result.

An independent issue in many fluidized bed reactors is the formation of large bubbles within the bed in the main reaction zone under certain conditions. Large bubbles are usually undesirable for several reasons.

First, the best heat and mass transport occurs with small bubbles. The reactor functions by exchanging reactants, products, and energy between the bed, made of a large number of small particles, and the fluid phase. Heat and mass transfer occurs at the surface of a bubble. As the mass and energy transport is often the limiting factor in determining the production rate, faster transport is desirable. Two ways to improve the transport rate include having a thinner boundary layer in the bubble and increasing the surface area available for transport. Unfortunately, the bubble's boundary layer is set by the reactor conditions and is not easily modified. However, with skill, the surface area can be greatly enlarged by designing the fluidized bed reactor system to have many small bubbles instead of a few large ones. One way to create smaller bubbles is to install a mechanical device called a bubble breaker. This device disrupts the large bubbles, breaking them up into multiple smaller bubbles and promoting better mixing.

Another unwanted effect of large bubbles, particularly in gas-solid systems, is that they cause the bed to bounce violently up and down as they lift a significant fraction of the bed, then drop it suddenly. This pressure oscillation can interfere with proper operation of the bed by causing the gas velocity rate to vary, which may be harmful to optimum productivity. The pressure oscillation also causes mechanical stress to the reactor structure and any directly connected support equipment. Again, using a bubble breaker to reduce the bubble size reduces or eliminates the unwanted effects of large bubbles.

Bubble breakers typically are static objects, such as coarse mesh screens or grids of bars or pipes that are installed across the direction of flow. Traditionally their role is solely to break up the large bubbles, producing several small bubbles in their place, and to not otherwise take part in the reaction within the reactor. Apparatus and methods for chemical vapor deposition on seed particles inside a fluidized bed reactor are disclosed herein. Improved techniques for converting silicon-bearing gasses to polycrystalline silicon in a solid form also are described.

In described arrangements, an obstructing member or bubble breaker is provided within the fluidized bed reactor. The bubble breaker is constructed to supply additional surface area for the addition of heat to the reaction zone. This effect can be used to reduce wall temperatures of the reactor, increase the diameter of the reactor, or both.

One or more pipes or similar conduits are positioned within a reactor to provide a bubble-breaker at a suitable location for the disruption of bubbles. Gas that has been heated above the desired reaction temperature flows through a passageway within the bubble breaker. Heat is transferred from the gas to the reaction zone. The cooled gas exiting from the bubble breaker can be pumped in a closed circuit back to its heater, sent to the reactor inlet at its exit temperature, or reheated and sent to the reactor inlet at some other temperature.

In particular arrangements, the bubble breaker includes two, three, four, or more generally U-shaped pipes or tubes. Flow through the individual tubes can be in series or parallel.

BRIEF DESCRIPTION OF THE DRAWINGS

In the drawings:

FIG. 1 is a schematic diagram of a system for the deposition of silicon onto particles inside a fluid bed reactor vessel;

FIG. 2 is a cross-sectional schematic view of a reactor for the deposition of silicon onto particles inside a fluid bed reactor vessel taken along line 2-2 of FIG. 1; and FIG. 3 is a vertical schematic view of a U-tube structure located within the reactor of FIG. 2.

DETAILED DESCRIPTION

Described herein are apparatus and methods for chemical vapor deposition of silicon onto seed particles inside the chamber of a reactor. At least one silicon-bearing gas, optionally with one or more diluent gasses, is injected into the reactor to maintain a body of silicon particles in a fluidized bed. As the silicon-bearing gas decomposes within the fluidized bed, silicon is deposited onto the silicon seed particles, producing silicon granules of increased size.

In disclosed arrangements, an obstructing member or "bubble breaker," is provided within the chamber to break large bubbles into smaller ones. The bubble breaker includes one or more conduits or tubes for passing a heated fluid through the interior of the reactor to transfer heat to the fluidized bed within the chamber. The high surface area of the tubes makes it possible to add heat efficiently to a central region of the reaction zone.

FIGS. 1-2 show an example of a fluidized bed reactor 10 for deposition of silicon onto fluidized seed particles. The fluidized bed reactor comprises a vessel having a wall 11 that defines a chamber 12. An inlet 13 is provided for delivering reactant gas into the chamber 12, and an outlet 14 is provided for venting exhaust gas from the chamber.

The reactor 10 has an obstructing member 15 comprising one or more tubes within the chamber 12. The illustrated bubble breaker is made of piping that hangs down from the top head 18 of the reactor 10.

The illustrated piping consists of two pipes or tubes 16 that are generally U-shaped and that are located in sufficiently close proximity to one another to break up large bubbles (e.g., bubbles with a diameter greater than 50% of the cross-section of chamber 12) moving upwardly through the chamber. The two U-shaped tubes 16 define passageways 17 that are connected in parallel. In other applications the tubes can be connected in series; and more or fewer tubes can be used depending on the size of the reactor and the amount of heat to be transferred. Advantageously, the length of bubble breaker 15 is about 50-75% of the height of reactor 10. In other words, the bottom of bubble breaker is at an elevation about one fourth to halfway up the chamber 12 from the base 24 of the reactor.

The bubble breaker tubes 16 are secured to withstand vibration and oscillation of the bed. As shown in FIGS. 2-3, strapping 20 can be provided to secure the generally U-shaped bubble breaker tubes in a bundle to minimize vibration and movement. As can be seen in FIG. 3, the U-shaped tubes can be stacked so that the lowest portions 21 of the tubes rest upon one another. The base portions 21 advantageously are secured together to further rigidify the structure and inhibit movement.

The bubble breaker should be made from materials that can withstand the severe conditions, particularly high temperature, inside the fluidized bed reactor. The exterior of the bubble breaker should be made of a material that can withstand bead abrasion. The material also should be compatible with the temperatures, reactants, and products within the reactor. The interior of the bubble breaker tubes should be made of a material that does not react with the heated fluid. The heated fluid can be any heated liquid or gas that does not react with the piping. But greatest efficiency is achieved when, as described herein, the heated fluid is a gas that can be passed from the bubble breaker via a reheater to the reaction chamber to participate in fluidization of the bed.

Bubble breakers as described herein best are used in combination with one or more other types of heater. Electric heaters (not shown) advantageously are provided at or near the floor of the reactor. In the past, electric heaters have been mounted on the walls of a fluidized bed reactor, but such wall-mounted heaters tend to be adversely affected by vibrations intrinsic to the operation of such reactors. Because the bubble breaker can be used to add heat at upper regions of the reaction chamber, wall-mounted electric heaters can be avoided. Floor-located heaters are less subject to vibration and thus will have an extended service life.

Because the described bubble breaker systems input heat at the center of the reaction chamber, it is possible to build reactors having reaction chambers of increased cross-sectional area and thus of increased reaction chamber volume, which can improve efficiency.

Operation of the illustrated system is discussed herein, as an illustrative example, in reference to the deposition of silicon by the decomposition of silane ($SiH_4$), using a process as generally described in publications such as U.S. Pat. No. 5,798,137. Hydrogen gas typically is used as a diluent in such systems. It should be understood that analogous apparatus and methods can be used for other known silicon-bearing precursor gasses, such as polysilanes ($Si_nH_{2n+2}$), chlorosilanes (e.g., silicon tetrachloride, trichlorosilane, dichlorosilane), bromosilanes, iodosilanes, and combinations thereof.

Initially, silicon seed particles 26 are placed within the chamber 12 of a reactor of the type illustrated in FIG. 1. The contents of the chamber 12 are heated to a suitable temperature.

Silane and any other fluidizing gasses are injected into the chamber 12 at or near the base 24 of the reactor 10. In the illustrated system, silane is delivered to the inlet 13 of the reactor from a gas source 25 via a pipe 22. Hydrogen from a source of supply 30 is injected into the fluidized bed reactor through one or more conventional injectors 42. The injected gasses together flow upwardly and cause fluidization of the bed of seed particles 26 inside the reactor. Gas exhausted from the top of the fluidized bed is vented from the chamber 12 through the outlet 14.

The tubes 16 act as a bubble breaker and break large gas bubbles (e.g., bubbles having a diameter greater than 50% of the cross-section of chamber 12) that form within the fluidized bed into smaller bubbles (e.g., bubbles having a diameter less than 20% of the cross-section of chamber 12).

For the addition of heat into the chamber 12, a heated fluid is passed through the passageways 17 of the bubble breaker tubes 16. In the illustrated system, hydrogen from the source of supply 30 flows to a first hydrogen heater 32, which raises the temperature of the hydrogen to about 1000° C. and thus serves as a source of heated fluid, particularly heated hydrogen. The hot hydrogen then flows through the tubes 16, transferring heat to the center of the bed 26. Hydrogen cools to about 700° C. as it passes through the tubes 16. The cooled hydrogen flows from the bubble breaker to a reheater 40, which heats the hydrogen to about 800° C., the desired fluidized bed reactor inlet temperature. The hot hydrogen gas then is injected into the fluidized bed reactor through one or more injectors 42 in a conventional manner.

Adequate gas flow rates through the tubes are needed to transfer the desired amount of heat. Because gas exiting the tubes is recycled to the chamber, the maximum gas flow rate is determined by the amount of gas need to operate the reactor. The minimum flow rate depends upon the desired amount of heat to be transferred and the surface area of the bubble breaker. As the flow rate decreases, the temperature of the gas must be increased to transfer sufficient heat to the chamber. However, the temperature cannot be so high that it reaches or surpasses the melting point of the tube material. Also, excess heat may result in undesirable side reactions occurring in the gas itself. Accordingly, the flow rate should be sufficient to allow the temperature of the gas to be below the melting point of the tubes, and below the temperature at which undesirable side reactions occur, while still transferring the desired amount of heat to the chamber.

The optimum size and number of pipes in the bubble breaker thus depend on the heat transfer area needed, the geometry needed to break up bubbles, and the necessary structural integrity of the bubble breaker. The size and number of pipes are determined, in part, using the equation:

$$Q=UA(dt)$$

where Q is the heat transfer, U is the thermal conductivity of the tube walls, A is the surface area of the tubes, and dt is the temperature difference between the fluidized bed in the chamber and the gas temperature in the tubes. Increasing the number of pipes or the pipe size increases surface area A, resulting in more heat transfer Q. However, the pipes cannot be so large or numerous as to restrict flow within the fluidized bed.

Heat transfer Q is calculated by determining the amount of heat needed in the reactor and subtracting any heat transferred into the chamber through the reactor walls (or adding any heat lost from the chamber through the reactor walls). Any heat added to the chamber by exterior gas preheaters is also subtracted to arrive at the desired value for Q. An exterior gas preheater allows the initial temperature of the gas in the bubble breaker to be lower. The gas transfers heat to the reaction zone through the bubble breaker walls. The gas then exits the bubble breaker, is reheated with a gas preheater, and is fed into the reaction zone. Thus, the same volume of gas actually transfers two increments of heat to the reaction zone.

In some embodiments, the reaction itself may produce heat and require that the chamber be cooled. In such cases, a cool, inert gas or fluid is run through the tubes to absorb and remove excess heat from the reaction zone. Rather than recycling the heated gas to the reaction zone, it is exhausted or transferred to another process requiring heat.

Once Q is determined, A is calculated. The actual geometry of the bubble breaker typically is determined empirically. Factors to consider include the fluid phase state (i.e., gas, liquid or solid), the seed particle size distribution, the density of the particles and the fluid, the desired temperature within the reaction zone, and the enthalpy change of the reaction.

Calculations show that adequate heat to support the reaction, e.g., silicon deposition, can be transferred into the reaction zone with a bubble breaker consisting of two generally U-shaped pipes 16 as shown in FIGS. 2-3, with gas flow through the two pipes in parallel. Any heat not removed from the gas on its trip through the bubble breaker is reclaimed in that less reheating is needed before injection into the reactor through the injectors 42.

The bed zone activity of the fluidized bed removes the usual surface boundary film that would reduce heat transfer. Therefore the heat transfer coefficient is higher than the usual case for a heat exchanger. The bed activity also moves bed particles around, carrying particles heated by the bubble breaker throughout the reaction zone.

The described bubble breaker systems are useful for controlling temperature conditions inside the reaction chamber of a silicon deposition fluidized bed reactor to various ends. The temperature of gas or liquid flowing through the bubble breaker can be adjusted higher or lower when, for example, a fluidized bed reactor needs to be cooled to maintain proper reaction conditions without diluting the concentration of reactants, or in cases where the reaction must be at some minimum temperature to proceed, but below some maximum temperature at which side reactions or decomposition would reduce the yield.

In some arrangements (not shown), a silicon-bearing reactant gas is used as the heated fluid passing through the bubble breaker. The gas is pre-heated before entering the tubes. After flowing through the bubble breaker, the gas flows to a reheater, which then heats the silicon-bearing reactant gas to the desired fluidized bed reactor inlet temperature. The silicon-bearing gas subsequently passes through an inlet and into the reaction chamber where it decomposes and deposits silicon on the seed particles. When the heating fluid is a reactant gas, only a small increase in the initial feed pressure will be sufficient to push it through the bubble breaker piping and into the reactor. There is no need to repressurize a hot gas.

In general, the gas or liquid flowing through the bubble breaker tubes should be stable at the operating temperature. In particular, it should not decompose to a solid which would soon plug the tubes. With the arrangement wherein a silicon-bearing reactant gas, particularly silane, is passed through the tubes, solid silicon may deposit. However, vibration of the bubble breaker typically will cause the silicon to flake off before the deposit becomes too thick.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims.

The foregoing and other objects, features, and advantages of the invention will become more apparent from the following detailed description, which proceeds with reference to the accompanying figures.

We claim:

1. A method for producing granular silicon by thermal decomposition of a gas containing silicon, the method comprising:
    passing a silicon-bearing gas upwardly through a fluidized bed of silicon particles inside a chamber within a reactor to deposit silicon from the silicon-bearing gas onto the particles;
    providing an obstructing member that is positioned within the chamber, that hangs down from a top head of the reactor, that is configured to break up gas bubbles in the fluidized bed, and that comprises one or more conduits defining one or more passageways;
    passing heated hydrogen through the one or more passageways at a temperature sufficient to transfer heat to the bed;
    reheating hydrogen leaving the one or more passageways; and
    injecting the reheated hydrogen into the chamber.

2. The method of claim 1 wherein:
    the providing of an obstructing member comprises providing an obstructing member that comprises plural tubes that extend into the chamber and that define the one or more passageways; and
    the passing heated hydrogen through the one or more passageways comprises passing the heated hydrogen in parallel through the plural tubes.

3. The method of claim 1 wherein:
    the providing of an obstructing member comprises providing an obstructing member that comprises plural tubes that extend into the chamber and that define the one or more passageways; and
    the passing heated hydrogen through the one or more passageways comprises passing the heated hydrogen in series through the plural tubes.

4. The method of claim 1 wherein the providing of an obstructing member comprises providing an obstructing member that comprises plural U-shaped tubes positioned to break up bubbles moving upwardly through the chamber.

5. A method for producing granular silicon by thermal decomposition of a gas containing silicon, the method comprising:
- passing a silicon-bearing gas upwardly through a fluidized bed of silicon particles inside a chamber within a reactor to deposit silicon from the silicon-bearing gas onto the particles;
- providing an obstructing member that is positioned within the chamber, that hangs down from a top head of the reactor, that is configured to break up gas bubbles in the fluidized bed, and that comprises plural U shaped tubes that extend into the chamber and that define the one or more passageways;
- passing heated hydrogen through the one or more passageways at a temperature sufficient to transfer heat to the bed;
- reheating hydrogen leaving the one or more passageways; and
- injecting the reheated hydrogen into the chamber through an inlet located such that the reheated hydrogen participates in fluidizing the bed.

* * * * *